US010891347B2

(12) United States Patent
Mall (10) Patent No.: US 10,891,347 B2
(45) Date of Patent: Jan. 12, 2021

(54) COMPUTER-IMPLEMENTED MANAGED REFERENCES IN ELECTRONIC DOCUMENT SYSTEMS

(71) Applicants: Atlassian Pty Ltd, Sydney (AU); Atlassian, Inc., San Francisco, CA (US)

(72) Inventor: Orpheus Mall, San Francisco, CA (US)

(73) Assignees: ATLASSIAN PTY LTD., Sydney (AU); ATLASSIAN INC., San Francisco, CA (US)

(*) Notice: Subject to any disclaimer, the term of this patent is extended or adjusted under 35 U.S.C. 154(b) by 0 days.

(21) Appl. No.: 16/362,058

(22) Filed: Mar. 22, 2019

(65) Prior Publication Data
US 2020/0192956 A1 Jun. 18, 2020

Related U.S. Application Data

(60) Provisional application No. 62/780,011, filed on Dec. 14, 2018.

(51) Int. Cl.
*G06F 16/9536* (2019.01)
*G06F 16/957* (2019.01)
*G06F 3/0481* (2013.01)
*G06F 16/9538* (2019.01)
*G06F 16/93* (2019.01)
(Continued)

(52) U.S. Cl.
CPC ...... *G06F 16/9536* (2019.01); *G06F 3/04812* (2013.01); *G06F 16/252* (2019.01); *G06F 16/94* (2019.01); *G06F 16/9538* (2019.01); *G06F 16/9577* (2019.01); *H04L 63/102* (2013.01)

(58) Field of Classification Search
CPC .................................................. G06F 16/9536
USPC ......................................................... 715/200
See application file for complete search history.

(56) References Cited

U.S. PATENT DOCUMENTS 9,009,162 B1\* 4/2015 Luo ........................ G06F 16/31
707/740
2014/0156763 A1\* 6/2014 Dubetz ................ G06Q 10/107
709/206

(Continued)

OTHER PUBLICATIONS

Carmel, David, Haggai Roitman, and Elad Yom-Tov. "Social bookmark weighting for search and recommendation." The VLDB Journal 19, No. 6 (2010): 761-775. (Year: 2010).\*

(Continued)

*Primary Examiner* — Frank D Mills
(74) *Attorney, Agent, or Firm* — Brownstein Hyatt Farber Schreck, LLP (57) ABSTRACT

Techniques for managing references in electronic document system are provided. The techniques proceed by storing managed references and associated metadata on a database, determining whether a user account is authorized to use a managed reference based on the associated metadata, requesting approval to use the managed reference from an owner account of the managed reference when determined the user account is not authorized to use the managed reference, and updating database to include the user account in notification about documents that use the managed reference and displaying managed reference with special visual treatment when receiving approval to use the managed reference.

18 Claims, 6 Drawing Sheets

(51) Int. Cl.
*G06F 16/25* (2019.01)
*H04L 29/06* (2006.01)

(56) References Cited

U.S. PATENT DOCUMENTS

2016/0072841 A1* 3/2016 Caporal .................. H04L 63/20
726/1
2017/0255883 A1* 9/2017 Grignon ................. G06Q 50/01
2017/0364599 A1* 12/2017 Ohanyerenwa ..... H04L 67/2804

OTHER PUBLICATIONS

Capra, Robert, Gary Marchionini, Javier Velasco-Martin, and Katrina Muller. "Tools-at-hand and learning in multi-session, collaborative search." In Proceedings of the SIGCHI Conference on Human Factors in Computing Systems, pp. 951-960. 2010. (Year: 2010).*

* cited by examiner

COMPUTER-IMPLEMENTED MANAGED REFERENCES IN ELECTRONIC DOCUMENT SYSTEMS

BENEFIT CLAIM

This application claims the benefit under 35 U.S.C. § 119(e) of provisional application 62/780,011, filed Dec. 14, 2018, the entire contents of which is hereby incorporated by reference for all purposes as if fully set forth herein.

FIELD OF THE DISCLOSURE

One technical field of the present disclosure is processing references or links in electronic documents, especially in collaborative electronic document sharing systems. Another technical field is processing references such as hashtags.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Certain computer-implemented electronic document processing systems use references within electronic documents to facilitate sharing documents, notification about relevant content and organization of documents. For example, in chat room systems, collaborative document authoring systems, social media and other applications, references termed "hashtags" may be used to associate a label or reference with an electronic document. The treatment of references such as hashtags varies in different systems. In some systems, storing a hashtag in an electronic document causes indexing the electronic document in an index; thereafter, other client computers or user accounts can request a display of all electronic documents that contain the hashtag, by specifying the hashtag in a search query. In other systems, the presence of a hashtag determines whether the associated electronic document appears in the output of a continuous query streaming database system, such as in a social networking feed or other streaming feed.

However, processing references of this type has drawbacks for users and other systems. One problem is that the use of such references is uncontrolled. Anyone can place a hashtag in an electronic document, whether it is appropriate or not. The result is that users interested in content that is genuinely relevant to a particular hashtag may receive content that is irrelevant or inappropriate. This wastes network bandwidth, storage resources and processing time.

Still another problem with some systems is creation of nearly duplicate references to refer to similar concepts or content. For example, assume that various user accounts have marked 500 documents using the reference "#pyscript" to indicate that documents relate to writing scripts in the PYTHON language, but a new user account marks a few documents using the reference "#scriptinginpython" to refer to the identical content or concept. The result is proliferation of multiple different references that are the same in meaning, as well as the failure of the system to associate a new document with prior ones that are relevant in the same way.

While some systems use auto-complete functions to suppress this effect, in which starting to type "#py . . . " as a reference will cause display of suggestions of "#pyscript" or others, auto-complete is an imperfect solution because it only works when at least a substring aspect of a new reference is similar to relevant prior references stored in a database.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Example Federated Application Environment

Figure 1:
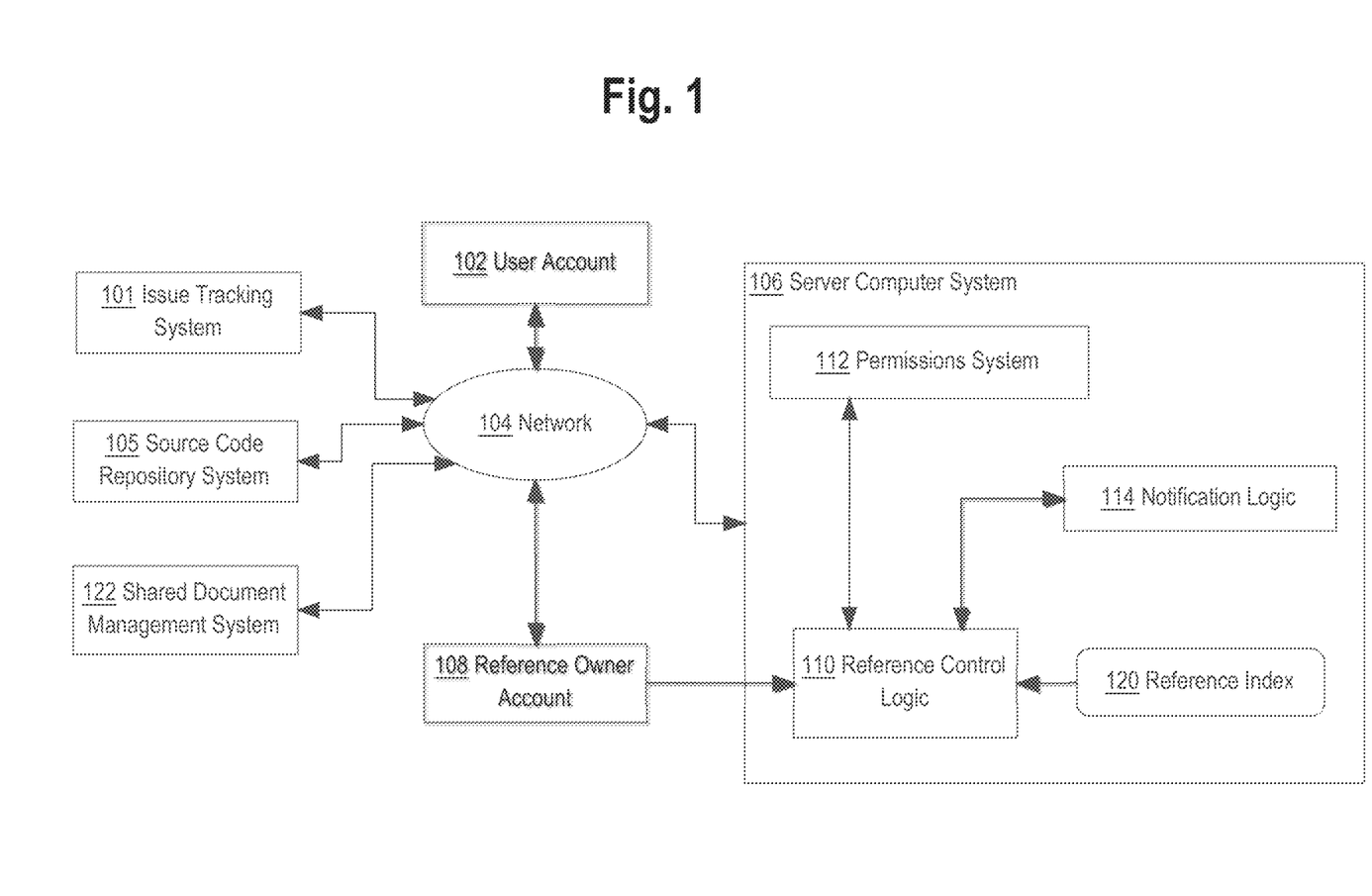
FIG. 1 illustrates an example networked distributed computer system with federated applications in which an embodiment may be used.

FIG. 1 illustrates an example networked distributed computer system with federated applications in which an embodiment may be used. In an embodiment, an issue tracking system 101, a source code repository system 105 and a shared document management system 122 are communicatively coupled via network 104 to a server computer system 106.

The source code repository system 105 hosts computer program source code organized, for example, as files and projects. The source code repository system 105 may implement version control, commenting, build automation for creating executables, storage of artifacts and ancillary items such as licenses, and other functions. The issue tracking system 101 supports creating issues or tickets with description fields that can identify projects, files or segments of program source code for which an issue has been identified. For example, an issue or ticket can comprise a bug report that identifies parts of source code that have bugs. The shared document management system 122 is programmed to enable creating, updating, and sharing collaborative electronic documents. Each of the issue tracking system 101 and a source code repository system 105 further comprises one or more data repositories which may be implemented as relational databases, object databases, column store databases or other data storage systems.

In an embodiment, issue tracking system 101, source code repository system 105 and shared document management system 122 are parts of a federated application program system in which different applications may use a common permissions system or single sign-on system, interchange data, and interoperate with shared databases for data such as user accounts, teams and projects. Examples of these systems include JIRA, BITBUCKET and CONFLUENCE, commercially available from Atlassian Pty Ltd, Sydney, Australia.

The network 104 broadly represents any combination of one or more local area networks, wide area networks, campus networks and/or internetworks. Packet-switched networks may be used with networking infrastructure devices such as switches and routers that are programmed to communicate packet data based on internet protocol (IP), a transport protocol such as TCP or UDP, and higher-order protocols at any of several different logical layers, such as those defined by the Open Systems Interconnect (OSI) multi-layer internetworking model.

User account 102 and reference owner account 108 are also communicatively coupled to network 104 and broadly represent users, user computers, client programs or accounts that can access and use issue tracking system 101, source code repository system 105 and shared document management system 122 alone or in combination with server computer system 106. In an embodiment, for purposes of illustrating a clear example in this disclosure, reference owner account 108 is associated with a computer or user that creates a managed reference, as further described herein, and user account 102 is associated with a different computer or user that uses the managed reference, with or without approval of the owner account.

Server computer system 106 may comprises one or more cores, processors, computers, and/or virtual machine instances hosted on the premises of an enterprise or using a public or private cloud computing facility. In an embodiment, server computer system 106 hosts or executes reference control logic 110, permissions system 112, notification logic 114 and reference index 120. In one embodiment, reference index 120 stores managed references and metadata in association with the manage references. Example metadata includes: account identifier of the reference owner; date of creation; date of last use. Permission system 112 stores permission information which indicates whether user accounts receive approval to use managed references in electronic documents. Notification system 114 pushes a notification to user accounts that have subscribed to the managed reference when a new reference has appeared, specifying that a new managed reference has appeared in the electronic document that the user account was working on. Reference control logic 110 is programmed, in general, to receive definitions of new managed references from reference owner account 108; index managed references in reference index 120; and interact with permissions system 112 and notification logic 114 to determine whether user account 102 receives approval to use managed references in electronic documents or the federated application program system and/or whether the user account receives notifications about documents that use managed references.

Example Reference Processing

Figure 2A:
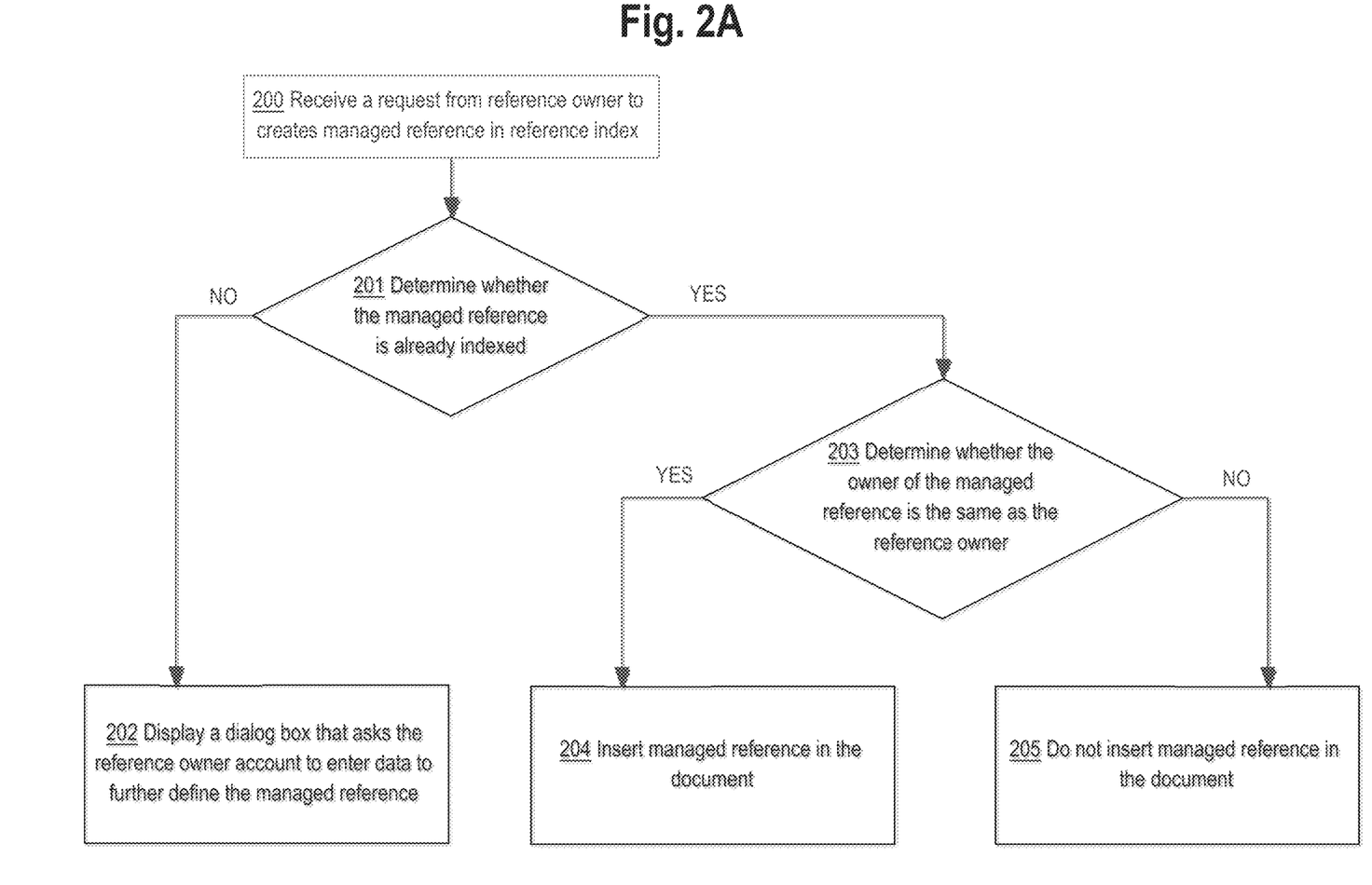
FIG. 2A illustrates an example flow diagram for creating managed reference in reference index.
Figure 2B:
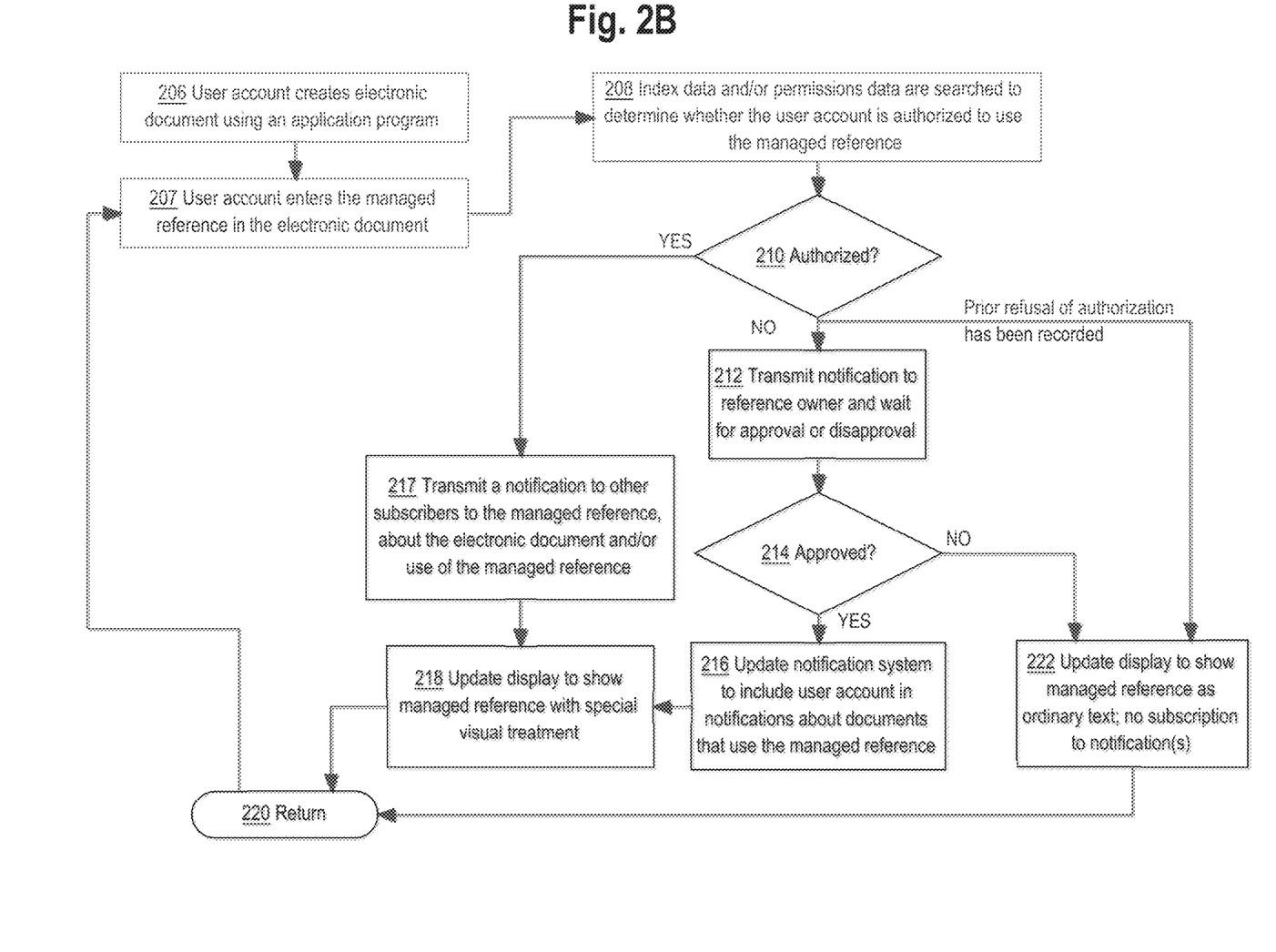
FIG. 2B illustrates an example flow diagram for using managed reference in electronic document.

In one embodiment, reference control logic 110 is programmed to execute a computer-implemented reference process. FIG. 2A and FIG. 2B illustrate two example flow diagrams for computer-implemented reference processing.

FIG. 2A illustrates an example flow diagram for creating managed reference in reference index. Referring to FIG. 2A, at block 200, a reference owner account sends a request to create managed reference in reference index. For purposes of illustrating clear examples, in this disclosure, "managed reference" may refer to any string of characters in an electronic document that is concatenated with, tagged with or associated with a token that identifies the string as a managed reference. In some embodiments, the token is "##" and a managed reference may be termed a managed hashtag. The form of an example managed hashtag is: ##TagWording. Other embodiments may use tokens other than "##", such as "&&", "@@", "!#" and so forth. Other embodiments may refer to managed references using labels or terms other than hashtags yet still be functionally equivalent to the techniques described herein.

In some embodiments, creating a managed reference at block 200 comprises typing or entering a new managed reference anywhere in an electronic document, during execution of a program application that manages the electronic document. Such an application may be part of a federated application program system but is not required to be. In response to the typing, in some embodiments, the application is programmed to automatically detect the token and to call the reference control logic 110 for further processing.

In one embodiment, reference control logic 110 may be programmed to query the reference index 120 to determine whether the managed reference is already indexed at block 201. If the managed reference is not already indexed, then reference control logic 110 may be programmed to generate and cause to display a dialog box that prompts the reference owner account to enter data to further define the managed reference at block 202. Example data may include: a graphical icon or digital image; a text definition. Reference control logic 110 may be programmed to automatically retrieve other metadata and store the metadata in association with a record of the managed reference in the reference index 120. Example metadata includes: account identifier of the reference owner; date of creation; date of last use. "Date" may refer to a timestamp in any format.

If the managed reference is already indexed, then reference control logic 110 may be programmed to query whether the account identifier of an owner of the managed reference is the same as the reference owner at block 203. If the account identifiers are the same, then the managed reference is inserted into the electronic document and a display of the electronic document is updated to visually emphasize or highlight the managed reference at block 204, as further described. If the account identifiers are different, then at block 205 the managed reference is not inserted.

In other embodiments, creating managed references may use a dedicated program, dialog box, or service with an independent dialog, panel or other GUI element, and that does not require initially typing or entering the new managed reference in an electronic document.

FIG. 2B illustrates an example flow diagram for using managed reference in electronic document. Referring to FIG. 2B, at block 206, another user account 206 creates an electronic document using an application. The application may or may not be part of a federated application program system and the specific kind of application and electronic document is not critical. The application could be a chat room system, collaborative document system, issue tracking system, digital board, and so forth. Typically, the application supports shared distribution or viewing of documents, with a notification system to alert users and/or provide a feed or streaming database output of documents that match a particular reference.

At block 207, the user account enters a managed reference in an electronic document. For example, user account 102 interacts with shared document system 122 to start typing a new hashtag. In some embodiments, an application such as shared document system 122 may be programmed with auto-complete logic that is programmed to detect a token signifying a managed reference, search the reference index 120 using a query comprising the characters after the token that the user account has entered thus far, and return a list of suggestions of existing managed references. This approach helps to reduce proliferation of duplicate or slightly different managed references that have the same semantics.

Block 208 to block 218 implement a curation stage for processing managed references. In general, user accounts are permitted to update electronic documents to include managed references only if the owner account of the managed reference approves use of the managed reference or has previously approved its use.

At block 208, index data and/or permissions data are searched to determine whether the user account is authorized to use the managed reference. For example, a query to reference index 120 may be submitted using a user account identifier, corresponding to the user account, as a key and a result set is received. At block 210, a test is performed to determine whether the data in the result set indicates that the user account is authorized to use the managed reference.

If the user account is authorized to use the managed reference, the control transfer to block 217 at which a notification is transmitted, to other user accounts that have subscribed to the managed reference, specifying that a new reference has appeared in the electronic document that the user account was working on. Therefore, other user accounts receive an alert, notification, or excerpt of the electronic document to inform them that new information of interest, and relevant to the managed reference, has been created.

In some embodiments, at block 218, a visual display of the current user account is updated using special visual treatment for the managed reference. For example, the managed reference is shown in the electronic document using distinct color, highlighting or other visual treatment to draw attention to the managed reference. The updating may be accomplished by a callback from control logic 110 to the application program or by the control logic generating and transmitting an updated electronic document or display instructions to the application.

If the user account is not authorized to use the managed reference as tested at block 210, then control transfers to block 212. Blocks 212, 214, 216 implement an approval workflow with which the reference owner account may selectively provide input specifying approval, or disapproval, of the user account to use the managed reference. Optionally, in some embodiments, if an approval has been previously recorded as indicated in reference index 120 or other data, then blocks 214, 214, 216 are skipped and control transfer to block 222, which is discussed later.

At block 212, the process transmits a notification to the reference owner account and waits for an input signaling approval or disapproval. In some embodiments, a notification is added to a notifications list or queue of the reference owner account and is visible when the reference owner account next logs in to one of the applications in the federated application program system. In other embodiments a notification may comprise a text message (SMS message), e-mail or other message transmission.

In some embodiments, during a period between the time that a user account enters a managed reference, and a second time at which the reference owner account provides approval for the use of the managed reference, the application will generate and display the managed reference in a visually distinct manner in a view to the other user account. For example, the managed reference may be displayed in a bubble, using a distinct color, with underlining, with grayed-out text, or any other visual treatment indicating pending approval.

At some point thereafter, the reference account owner provides input specifying approval or disapproval of the use of the managed reference in the electronic document. Input may be provided by selecting a notification in a notification list or queue and responding to prompts in a dialog that is triggered by selecting the notification. Or, input may be provided by replying to a text message using a specified character, connecting using a special-purpose URL and web server to a list of workflow items including unresolved requests for approval, or other programmatic mechanisms.

At block 214, the process executes a test to determine whether the user account is approved to use the managed reference in the electronic document. If approval is signaled, then at block 216, a notification system is updated to include the user account in future notifications about documents that use the managed reference. In some embodiments, block 216 may be implemented by reference control logic 110 programmatically updating databases or records controlled by permission system 112 or notification logic 114 that determine which user accounts can access or view documents with different references. Thereafter, the same user account also acquires permission to view a list of existing documents in the federated application program system that use the same managed reference.

Control may transfer to block 218 to cause updating a visual display of the user account in the manner previously discussed.

Thus, the effect of block 207, 208, 210, 212, 214, 216 is, in response to a signal of approval for a user account to use a managed reference in an electronic document, that user account obtains permission to display the managed reference in a visually distinct manner in electronic documents in that user account's view of the electronic document, to receive notifications of other uses of the same managed reference in other electronic documents, and to view existing electronic documents that also use the same managed reference.

Without approval of the use of the managed reference, these acts are not possible or are inhibited by programmed logic of the system. Thus, at block 222, if the user account is not approved to use the managed reference in the electronic document at block 214 or if prior refusal of authorization has been recorded at block 210, the display seen at the user account of is updated to show the attempted use of the managed reference as ordinary text, rather than as a visually emphasized managed reference. For example, if the managed reference is "##DataAnalysis" but the previously described process results in denial of approval at block 214, the electronic document would show the wording "DataAnalysis" and the application program hosting the electronic document would suppress display of the token and/or any special visual treatment of the wording.

At block 220, control may return to block 207 for user account to enter other managed references in electronic documents or to a calling method, object program or process.

Example Graphical User Interface Implementation

Figure 3A:
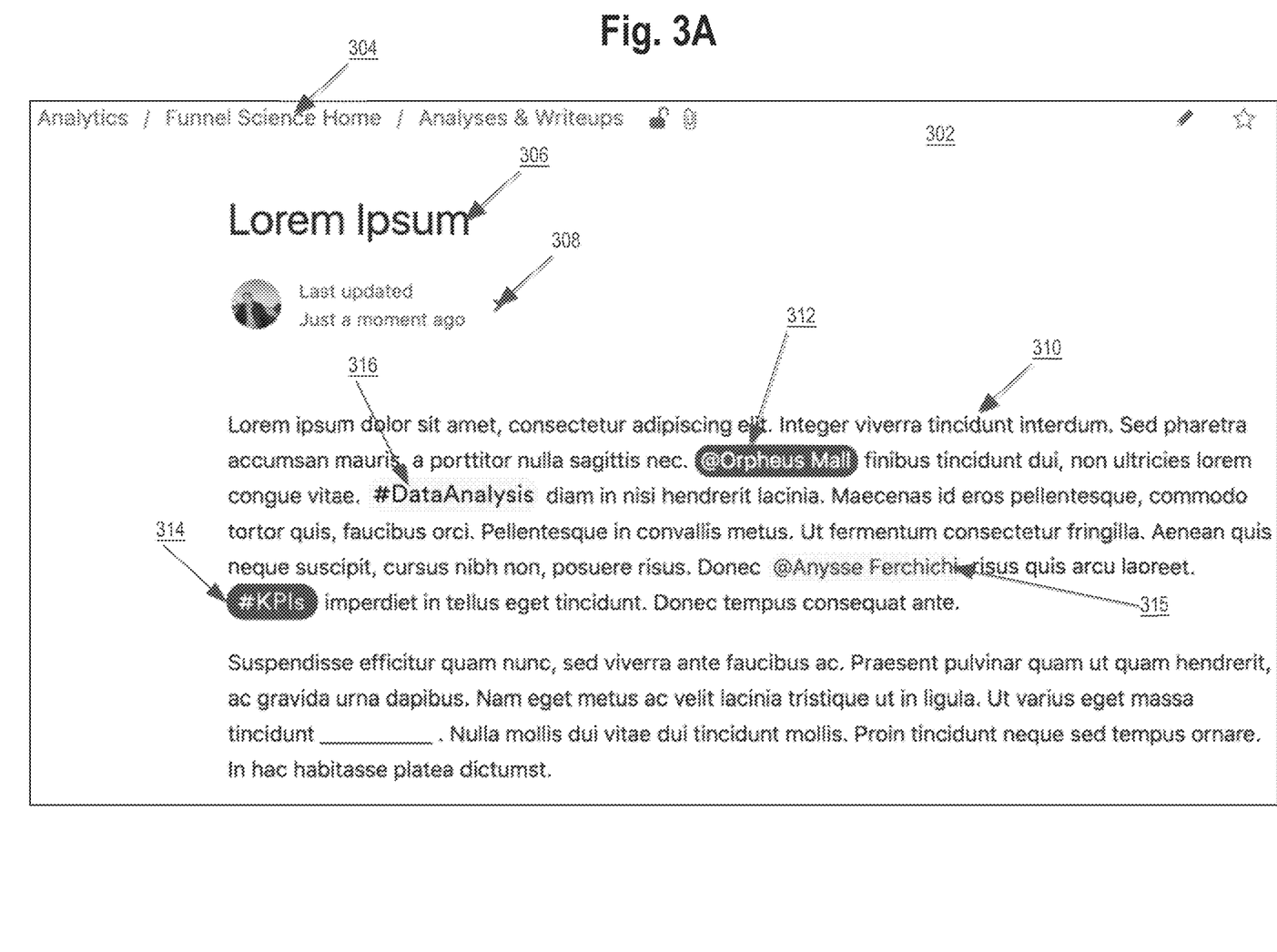
FIG. 3A illustrates an example graphical user interface that may be generated and displayed by one of the federated applications and showing a managed reference.
Figure 3B:
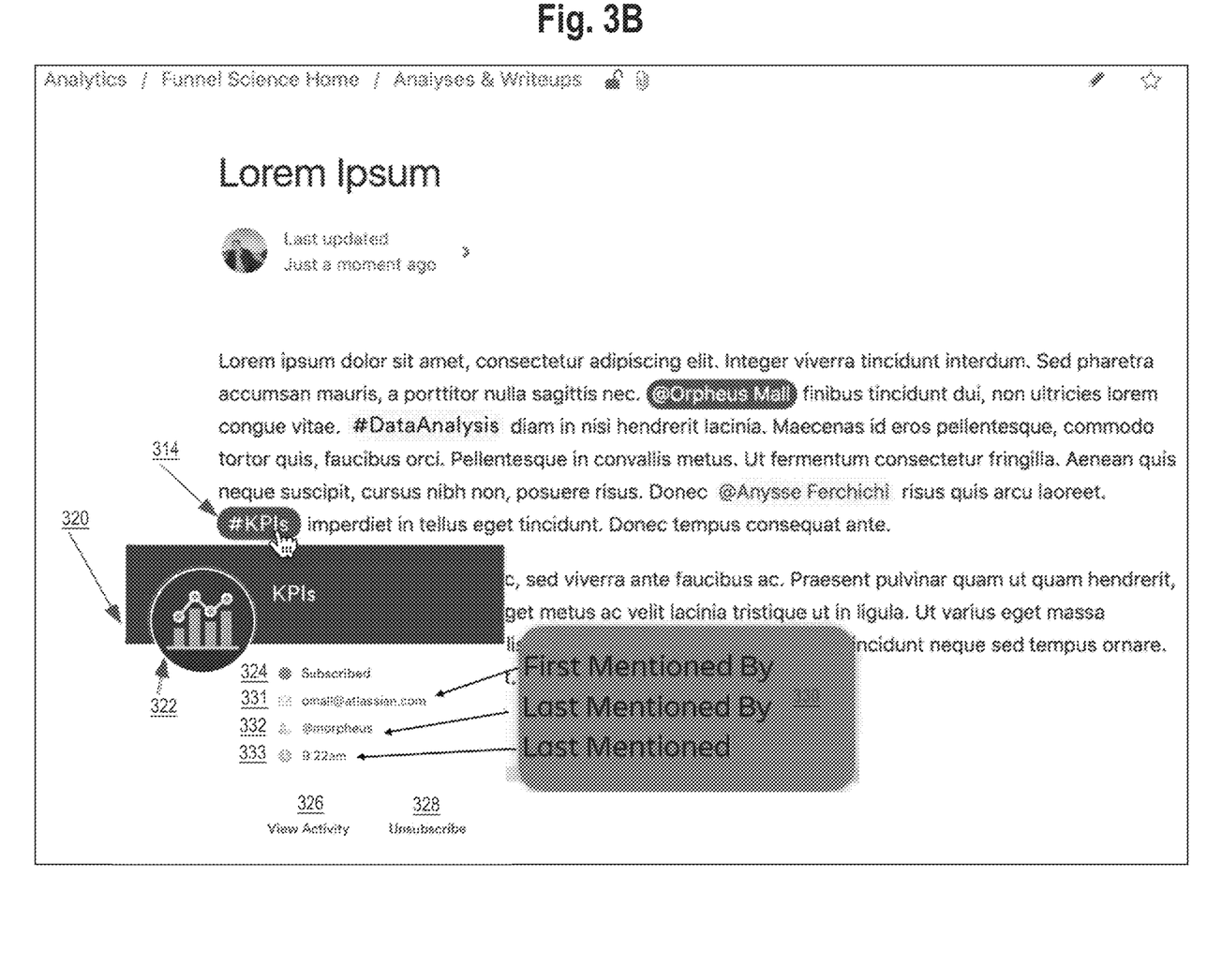
FIG. 3B illustrates an example graphical user interface that may be generated and displayed by one of the federated applications and showing a dialog box relating to a managed reference.

FIG. 3A illustrates an example graphical user interface that may be generated and displayed by one of the federated applications and showing a managed reference. FIG. 3B illustrates an example graphical user interface that may be generated and displayed by one of the federated applications and showing a dialog box relating to a managed reference.

Referring first to FIG. 3A, as one example, a graphical user interface display window 302 comprises a breadcrumbs list 304, a title 306, user account data 308 and electronic document contents 310. In an embodiment, breadcrumbs list 304 specifies names of pages of an application program that have been traversed to obtain a display of window 302, or to indicate a hierarchy or organization of pages or application functions. The title 306 specifies a title of an electronic document that a particular application program is managing. The user account data 308 specifies an image or name of a user account that is currently using an application and electronic document, and a time at which the user account last updated the document. The last update time helps the user visually confirm that edits or changes have been saved.

The electronic document contents 310 comprise a plurality of lines of text, a first at-mention 312, an unsubscribed reference 316, a subscribed reference 314 and a second at-mention 315. In an embodiment, first at-mention 312 identifies the same account as currently logged in and viewing the electronic document, and therefore the first at-mention is visually displayed using special treatment, such as color, highlighting and so forth. This special visual treatment causes the then-current user account to draw attention to mention of themselves in the electronic document. Similarly, second at-mention 315 identifies a different user account than the user account that is currently viewing the electronic document.

In an embodiment, unsubscribed reference 316 identifies a reference that has been validly entered in the electronic document by some user account, but for which the current user account has not subscribed for notifications. Subscribed reference 314 identifies a reference that has been validly entered in the electronic document by some user account and for which the current user account has subscribed for notifications, and therefore the subscribed reference is indicated visually with special visual treatment such as color, highlighting or other marking.

Referring now to FIG. 3B, in some embodiments, for managed references that have been properly added to electronic documents, user input indicating hovering over or clicking on the managed reference causes displaying a pop-up dialog box 320, or displaying a new screen in a mobile version, showing: an icon 322 associated with the managed reference; name of managed reference; a subscribed flag 324 indicating whether the current logged-in user account has subscribed to notifications for new uses of that managed reference; contact information 330 including (a) an email address 331 or handle indicating the user account that first created or mentioned the hashtag; (b) a user account 332 indicating the user account that most recently used or mentioned the hashtag in any electronic document; and (c) a time value 333, in local time of the currently logged-in user account, indicating the time at which another user account most recently used the hashtag anywhere. Last mention data indicated by contact information 330 could relate to mentions in other applications of a federated application program system.

In an embodiment, dialog box 320 also comprises a Subscribe or Unsubscribe link or button 328. In some embodiments, a managed reference is displayed either in a distinctive visual representation, or not in a distinctive visual representation. The display of a managed reference in a distinctive visual representation indicates that the particular user account that is logged in, is subscribed to the associated managed reference. Referring to FIG. 3B, "#KPIs" is a subscribed reference and is displayed in a distinctive manner using highlighting. Display of a managed reference in a distinctive visual representation may comprise using color, highlighting, or other graphical visual emphasis depending on the capabilities of the computer display system in use. In contrast, display in a non-distinctive manner means that the current user account is not subscribed to that managed reference. Referring to FIG. 3B, "#DataAnalysis" is an unsubscribed reference and is displayed in a non-distinctive manner without highlighting. If the user account is subscribed, then the button 328 would be labeled Unsubscribe, as seen in FIG. 3B. Selecting the button causes unsubscribing the current user account to the managed reference. Similarly, if the user account is not subscribed to this reference, then the button 328 would be labeled Subscribe. Selecting the button causes subscribing the current user account to the managed reference if permissions data indicates approval or triggering the approval dialog described above.

The dialog box 320 further comprises a View Activity button 326 which, when selected, causes displaying a list of electronic documents, and/or excerpts from the content of the electronic documents, in which the managed reference has been used. In an embodiment, the list is displayed in the order of most recent mentions of the managed reference. In another embodiment, the list is displayed based upon relevance of electronic documents containing a reference to the current user account, based on other information about relevance available to the system. A format of the list of documents may vary in different embodiments; for example, a list may comprise an icon indicating which application, of a federated application system, is used to open a document in the list; a title of an electronic document; a project with which a document is associated; excerpts from content and so forth. The list can include pages, comments, or other electronic documents. In some embodiments, documents appear in a list only when the current user account is permitted to view the documents under a permissions manager associated with the system.

Managed References and Unmanaged References

Based on the foregoing, references such as hashtags may be unmanaged or managed. Unmanaged references have the following attributes: Allows for free-form content management. Use #hashtag to create and use a reference. Hashtags appear in an auto-complete list. Click on hashtag to bring up a pop-up dialog box or a new screen on a mobile device. The pop-up dialog box or the new screen on a mobile device can be used to subscribe and unsubscribe the selected reference. The pop-up dialog box or the new screen can also be used to view history of mentions.

In contrast, the managed references of this disclosure have these attributes: Allows for a more curated content experience. Use ##reference to create a managed reference or managed hashtag, or some other token to denote a managed reference. Gives the creator ownership of the hashtag and allows the owner to determine which user accounts or team members can use it. If a user account does not have permission to use the managed reference, then that managed reference does not appear in an auto-complete list. Consequently, entering the managed reference would cause the application to display the wording of the managed reference as plain text within the electronic document. For example, if the managed reference is ##DataAnalysis, but a user account does not have permission to use it, then the application would automatically suppress the ## characters and display DataAnalysis in the document alone. The result is that the user account has not actually created a reference in the electronic document and no indexing, notification, alerts or other processing is done for the wording DataAnalysis.

In contrast, if the user account is given permission to use the managed reference, then the application would index the reference and display it as a normal reference, for example, as "#DataAnalysis" rather than "##DataAnalysis". In some embodiments, the wording of the reference may be displayed in association with a symbol or icon that visually indicates that the reference is a managed reference. For example, a key icon, star icon or other visual symbol may signal visually that the following characters or wording is a managed hashtag. Other embodiments may use a distinct visual representation, such as color, underlining, special type fonts, highlighting or other graphical visual treatment to indicate a managed hashtag.

Users may or may not still use the managed reference, but the manager will curate whether it ends up in feed or not. Free user access can be turned on or off. Curating can be turned on or off. Curating means that when a user account, other than the owner of the managed reference, enters the managed reference in a document, the application generates and transmits a notification to the account of the owner of the managed hashtag. When the owner of the managed reference is logged in to the federated application system, the owner can access a list or other display of notifications. Selecting a notification indicating new use of the managed reference causes displaying a dialog, panel or page in which the owner account can provide input indicating approval or disapproval for the other user account and document associated with the notification.

In addition, non-approval by the curator means that other user accounts are not notified of the use of the managed hashtag. This technique provides the important benefit in efficiency that documents not properly associated with a managed reference will not appear in the stream, feed or other list of user accounts that have subscribed to the managed reference. Consequently, the owner of the managed reference has the capability to control or constrain the tagging, marking and ultimately distribution by notification to only those documents that validly use the managed reference.

A managed reference may be managed by a first user account that is different than a second user account to which the managed reference refers. For example, assume that a corporation or other entity has a chief executive officer named Kris Founder, as well as an executive assistant. The CEO, Founder, may prefer to have the managed reference "founder" entered only in electronic documents that originate with the office of Founder. The account of the executive assistant, rather than the account of Founder, could create the managed reference "##founder" and manage all uses of that reference on behalf of Founder.

Furthermore, a managed reference may receive higher priority than unmanaged reference in reference search. For example, assume that a user writing scripts in the PYTHON language wants to have a managed reference entered to indicate the scripts are programmed in the PYTHON language. The user may type in a reference "#scriptinginpython", and references refer to the identical concept may be detected in reference search. For example, both managed reference "#pyscript" and unmanaged reference "scriptinginpython" may be identified and be presented in a list to the user. The managed reference "#pyscript" may be given a relatively high priority and appear relatively high in the list. The unmanaged reference "scriptinginpython" may be given a relatively low priority and appear relatively low in the list.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
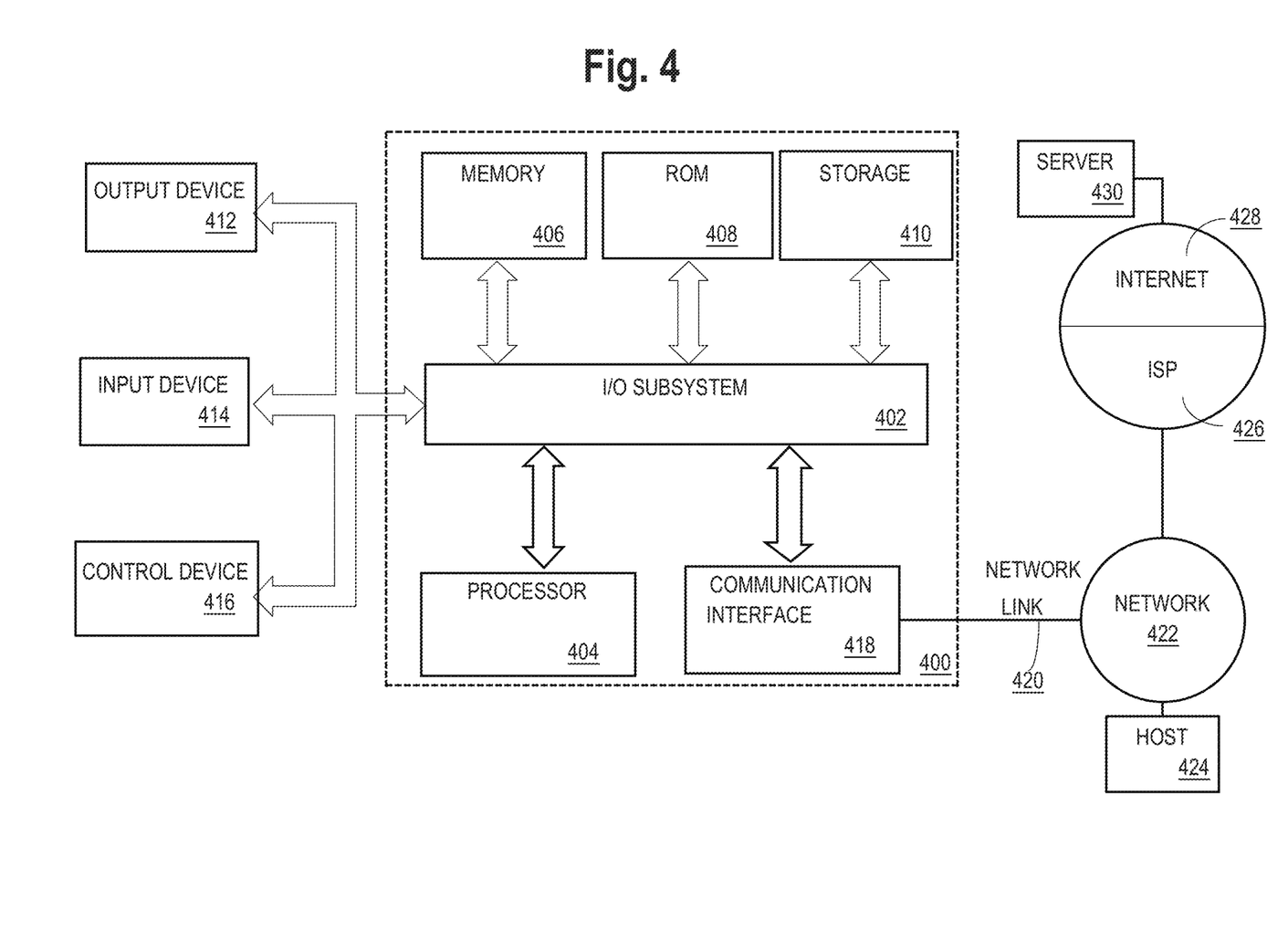
FIG. 4 illustrates a computer system with which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    maintaining, on a digital storage device, a database that stores data associated with: a plurality of managed references that are associated with a plurality of user accounts that are authorized to use said plurality of managed references, a plurality of unmanaged references that are not associated with the plurality of user accounts, and a plurality of documents that use said plurality of managed references;
    receiving, at a server computer that is coupled to said digital storage device, a request from a client computer of a plurality of client computers to use a managed reference in the database, wherein the request includes said managed reference that was typed into a client user interface and a user account associated with said client computer;
    determining, by the server computer, whether said user account is authorized to use said managed reference;
    transmitting a notification to other user accounts that are authorized to use said managed reference in response to determining said user account is authorized to use said managed reference;
    sending an authorization request to an owner account in response to determining said user account is not authorized to use said managed reference;
    receiving, by the server computer, feedback from said owner account that indicates approval or non-approval to use said managed reference by said user account;
    updating the database to include said user account in notifications about documents that use the managed reference in response to receiving approval to use said managed reference from said owner account;
    receiving a request to create a managed reference in the database, wherein the request includes the managed reference that was typed into the client user interface;
    in response to determining that the managed reference is not in the database, generating and causing displaying a request for additional information;
    in response to determining that the managed reference is in the database, determining that the user account is an owner of the managed reference and inserting the managed reference;
    receiving, by the server computer, a reference search query that indicates a reference to be searched;
    identifying, based on the reference search query, a particular managed reference of the plurality of managed references and a particular unmanaged reference of the plurality of unmanaged references, the particular managed reference and the particular unmanaged reference matching the reference to be searched;
    generating and causing displaying a list comprising at least the particular managed reference and the particular unmanaged reference, the particular managed reference being displayed higher in the list than the particular unmanaged reference.

2. The method of claim 1, further comprising updating a visual display of said user account using special visual treatment for said managed reference in response to determining said user account is authorized to use said managed reference.

3. The method of claim 1, further comprising updating a visual display of said user account to show said managed reference as ordinary text in response to determining said user account is not authorized to use said managed reference.

4. The method of claim 1, further comprising displaying a new screen in response to receiving a user input indicating hovering or clicking on said managed reference, wherein said new screen comprising an icon associated with said managed reference, a name of said managed reference, a subscribed flag of said managed reference, and contact information related to said managed reference.

5. The method of claim 4, wherein said new screen further comprising a view activity button which, when selected, causes displaying a list of documents in which said managed reference has been used.

6. The method of claim 4, wherein said new screen further comprising a unsubscribe button which, when selected, causes unsubscribing said user account to said managed reference.

7. The method of claim 4, wherein said contact information related to said managed reference comprising an email address indicating a first user account that first created said managed reference.

8. The method of claim 4, wherein said contact information related to said managed reference comprising a second user account that most recently used said managed reference.

9. The method of claim 4, wherein said contact information related to said managed reference comprising a time value indicating a time of a most recent use of said managed reference.

10. One or more non-transient computer readable storage media comprising instructions which, when executed by a processor, cause the processor to:
    maintain on a digital storage device, a database that stores data associated with: a plurality of managed references that are associated with a plurality of user accounts that are authorized to use said plurality of managed references, a plurality of unmanaged references that are not associated with the plurality of user accounts, and a plurality of documents that use said plurality of managed references;

receive, at a server computer that is coupled to said digital storage device, a request from a client computer of a plurality of client computers to use a managed reference in the database, wherein the request includes said managed reference that was typed into a client user interface and a user account associated with said client computer;

determine, by the server computer, whether said user account is authorized to use said managed reference;

transmit a notification to other user accounts that are authorized to use said managed reference in response to determining said user account is authorized to use said managed reference;

send an authorization request to an owner account in response to determining said user account is not authorized to use said managed reference;

receive, by the server computer, feedback from said owner account that indicates approval or non-approval to use said managed reference by said user account;

update the database to include said user account in notifications about documents that use the managed reference in response to receiving approval to use said managed reference from said owner account;

receive a request to create a managed reference in the database, wherein the request includes the managed reference that was typed into the client user interface;

in response to determining that the managed reference is not in the database, generate and cause display of a request for additional information;

in response to determining that the managed reference is in the database, determine that the user account is an owner of the managed reference and insert the managed reference;

receive, by the server computer, a reference search query that indicates a reference to be searched;

identify, based on the reference search query, a particular managed reference of the plurality of managed references and a particular unmanaged reference of the plurality of unmanaged references, the particular managed reference and the particular unmanaged reference matching the reference to be searched;

generate and cause display of a list comprising at least the particular managed reference and the particular unmanaged reference, the particular managed reference being displayed higher in the list than the particular unmanaged reference.

11. The non-transient computer readable storage media of claim 10, further comprising instructions which, when executed by the processor cause the processor to update a visual display of said user account using special visual treatment for said managed reference in response to determining said user account is authorized to use said managed reference.

12. The non-transient computer readable storage media of claim 10, further comprising instructions which, when executed by the processor cause the processor to update a visual display of said user account to show said managed reference as ordinary text in response to determining said user account is not authorized to use said managed reference.

13. The non-transient computer readable storage media of claim 10, further comprising instructions which, when executed by the processor cause the processor to display a new screen in response to receiving a user input indicating hovering or clicking on said managed reference, wherein said new screen comprising an icon associated with said managed reference, a name of said managed reference, a subscribed flag of said managed reference, and contact information related to said managed reference.

14. The non-transient computer readable storage media of claim 13, wherein said new screen further comprising a view activity button which, when selected, causes displaying a list of documents in which said managed reference has been used.

15. The non-transient computer readable storage media of claim 13, wherein said new screen further comprising a unsubscribe button which, when selected, causes unsubscribing said user account to said managed reference.

16. The non-transient computer readable storage media of claim 13, wherein contact information related to said managed reference comprising an email address indicating a first user account that first created said managed reference, a second user account that most recently used said managed reference, and a time value indicating a time of a most recent use of said managed reference.

17. A system comprising:
a processor,
a communication interface, and
a non-transitory computer-readable storage medium storing sequences of instructions, which, when executed by the processor, cause the processor to:
maintain on a digital storage device, a database that stores data associated with: a plurality of managed references that are associated with a plurality of user accounts that are authorized to use said plurality of managed references, a plurality of unmanaged references that are not associated with the plurality of user accounts, and a plurality of documents that use said plurality of managed references;

receive a request from a client computer of a plurality of client computers to use a managed reference in the database, wherein the request includes said managed reference that was typed into a client user interface and a user account associated with said client computer;

determine whether said user account is authorized to use said managed reference;

transmit a notification to other user accounts that are authorized to use said managed reference in response to determining said user account is authorized to use said managed reference;

send an authorization request to an owner account in response to determining said user account is not authorized to use said managed reference;

receive feedback from said owner account that indicates approval or non-approval to use said managed reference by said user account;

update the database to include said user account in notifications about documents that use the managed reference in response to receiving approval to use said managed reference from said owner account;

receive a request to create a managed reference in the database, wherein the request includes the managed reference that was typed into the client user interface;

in response to determining that the managed reference is not in the database, generate and cause display of a request for additional information;

in response to determining that the managed reference is in the database, determine that the user account is an owner of the managed reference and insert the managed reference;

receive a reference search query that indicates a reference to be searched;

identify, based on the reference search query, a particular managed reference of the plurality of managed references and a particular unmanaged reference of the plurality of unmanaged references, the particular managed reference and the particular unmanaged reference matching the reference to be searched;

generate and cause display of a list comprising at least the particular managed reference and the particular unmanaged reference, the particular managed reference being displayed higher in the list than the particular unmanaged reference.

18. The system of claim 17, further comprising instructions which, when executed by the processor cause the processor to update a visual display of said user account using special visual treatment for said managed reference in response to determining said user account is authorized to use said managed reference.

* * * * *